United States Patent [19]

Thompson

[11] 4,250,641
[45] Feb. 17, 1981

[54] PRE-CLOSED SLIDE MOUNT

[75] Inventor: Edwin R. Thompson, Stamford, Conn.

[73] Assignee: Forox Corporation, Stamford, Conn.

[21] Appl. No.: 952,409

[22] Filed: Oct. 18, 1978

[51] Int. Cl.$^3$ .......................... A47G 1/06; G09F 1/10
[52] U.S. Cl. ..................................... 40/158 B; 40/159
[58] Field of Search ............. 40/152, 154, 156, 158 R, 40/158 B, 159, 404, 405

[56] References Cited

U.S. PATENT DOCUMENTS

| | | | |
|---|---|---|---|
| 2,383,465 | 8/1945 | Bradford | 40/152 |
| 2,390,053 | 12/1945 | Bradford | 40/158 R |
| 3,341,960 | 9/1967 | Florjancic | 40/152 |
| 3,477,160 | 11/1969 | Clark | 40/152 |
| 4,104,818 | 8/1978 | Hrabik | 40/152 |

FOREIGN PATENT DOCUMENTS

| | | | |
|---|---|---|---|
| 1311727 | 10/1962 | France | 40/152 |
| 1224818 | 3/1971 | United Kingdom | 40/152 |
| 1435366 | 5/1976 | United Kingdom | 40/158 B |

*Primary Examiner*—John F. Pitrelli
*Assistant Examiner*—G. Lee Skillington
*Attorney, Agent, or Firm*—Parmelee, Johnson, Bollinger & Bramblett

[57] ABSTRACT

An improved pre-closed slide mount is described having two sides or masks which are secured together for defining an internal pocket to retain a film transparency which is inserted edgewise through an opening or entranceway in one edge of the mount and defining a window for viewing the transparency in the mount. An elevated border region formed in one mask of the mount extends transversely across the entranceway and has a sloping outer surface to provide a funnel for directing a transparency into the entranceway, and this border region has laterally sloping ends which define two spaced valleys the purpose of which is to receive the outer edges of a longitudinally bowed film strip serving as pusher for the inserted transparency. The outer edges of the valleys are defined by lateral transparency guides. The border region of the other mask forms an elevated roof over the elevated border region with inverted steps over the laterally sloping end portions of the border region. A transparency funneled between the elevated border region and the roof slides between the inverted steps and the elevated border region and thereby moves into the entranceway. A deflecting surface behind the elevated roof deflects a transparency downwardly into the transparency pocket behind the elevated border region, and the border region then retains the transparency within the pocket. Clamping ribs are provided adjacent the window to grip the transparency within the pocket. A retraction clearance slot may be provided adjacent one of the valleys the purpose of which is to provide clearance for a transparency pusher as it is being retracted while lateral movement of the slide mount commences.

18 Claims, 12 Drawing Figures

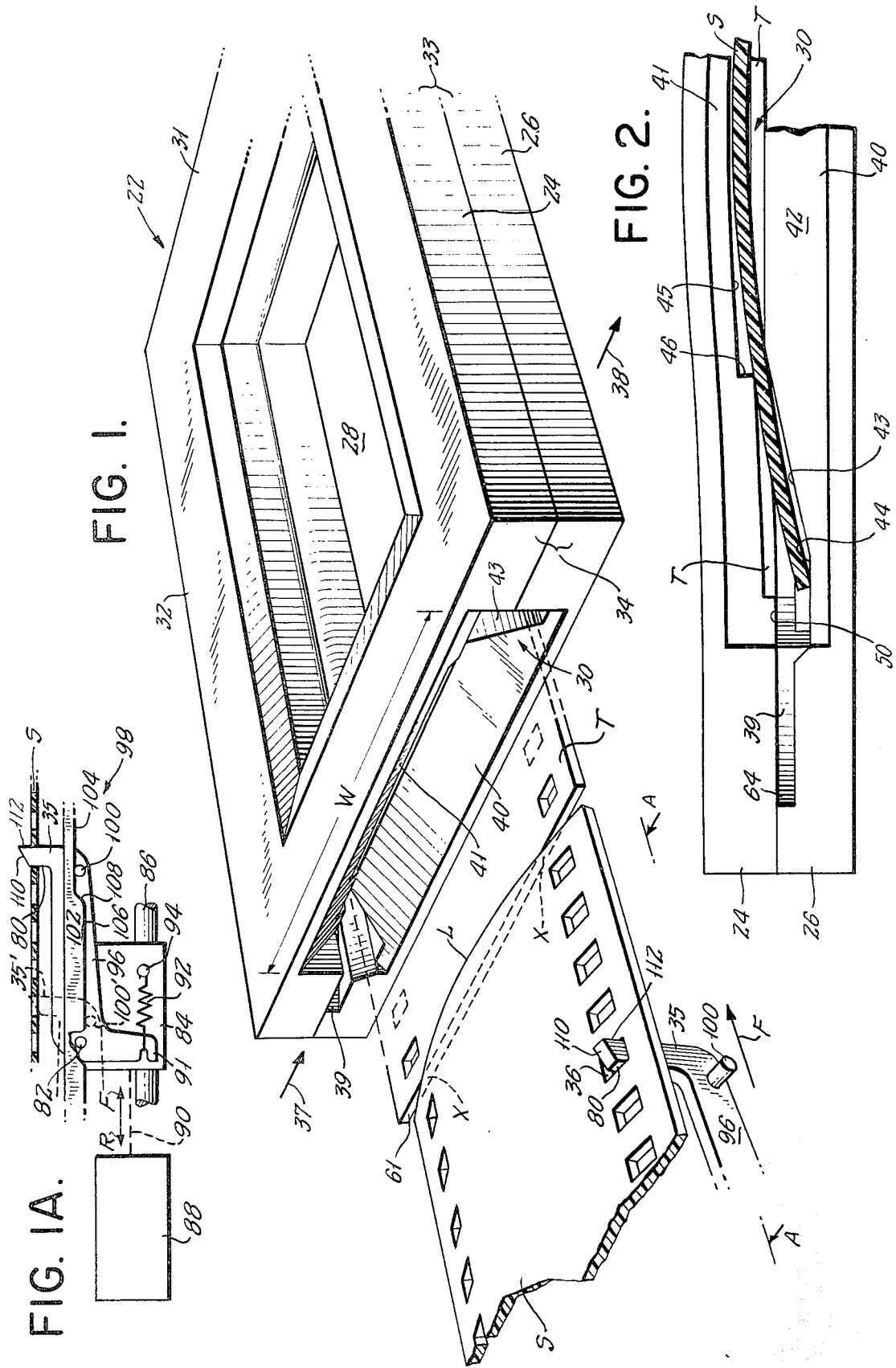

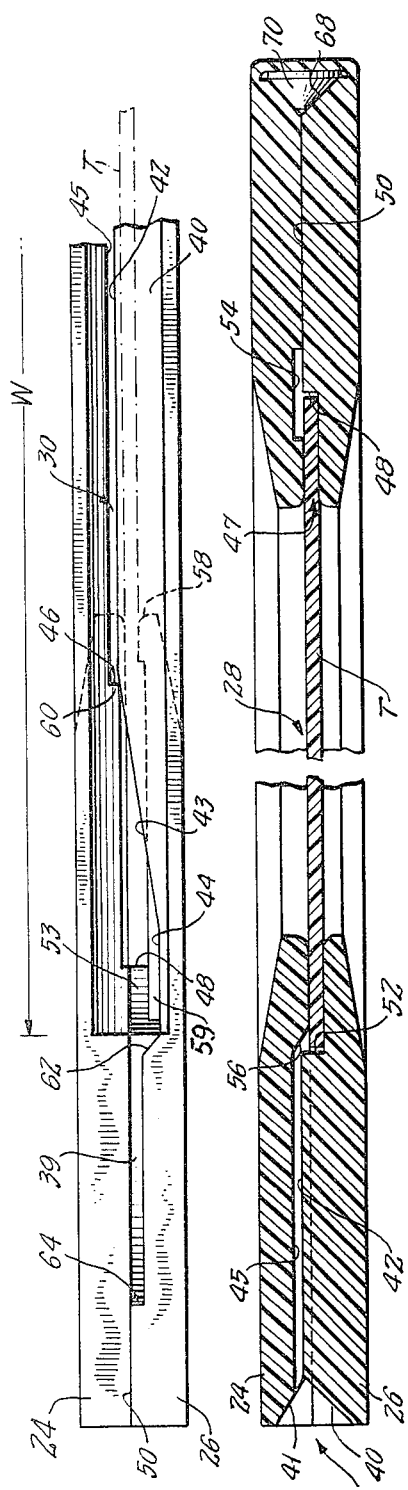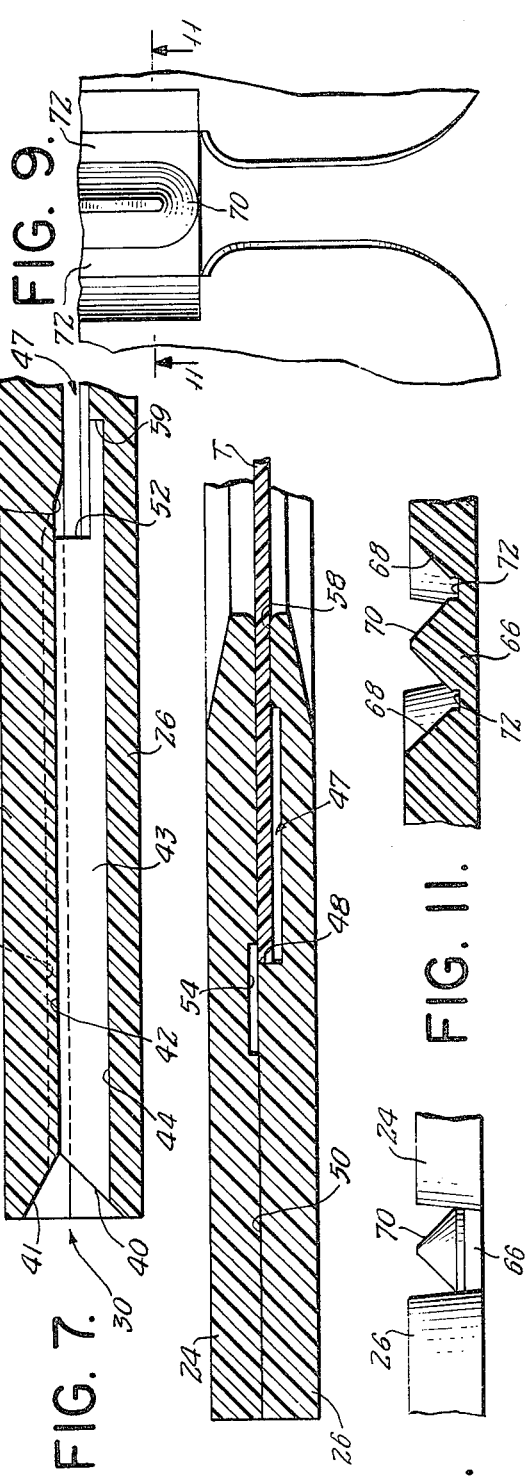

PRE-CLOSED SLIDE MOUNT

BACKGROUND OF THE INVENTION

This invention relates to slide mounts and more particularly to such mounts which facilitate automatic loading of film transparencies into pre-closed slide mounts.

Film transparencies have long been clamped between masks to form photographic slides. In recent years, those transparencies have been automatically loaded through one edge of a slide mount formed of two joined masks. For example, in the U.S. Pat. No. 3,952,434 to Peter Florjancic, a transparency is pushed by a flat pusher element between spreadable transverse bridges of the two masks. These transverse bridges in the Florjancic mount normally have their inner faces in contact one with the other across the full width of the entranceway. Therefore, to provide sufficient room for inserting the film transparency these bridges must be bowed relatively widely apart, which is not a desirable operation; and this wide bowing of the bridge is accomplished by the exertion of a relatively large force, which is not desirable when pushing a relatively delicate film transparency into the pocket between the plastic masks. In other words, the Florjancic mount offers considerable resistance or impediment to the insertion of a film transparency, and the resultant significant forces involved can lead to operating problems or to damage of film transparency or mount. Because the pocket is spaced inwardly from the outer edge of the slide mount, it is necessary that the pusher follow the transparency through the entranceway, so that the film transparency becomes fully pushed into the pocket.

In U.S. Pat. No. 3,470,642 to Peter Mundt and Peter Florjancic is disclosed a slide mount having an insertion slot which extends fully across one end of the mount and also extends part of the way along the two side edges of the mount. Thus, the two border portions of the mount which define the insertion slot between them are entirely self-supporting for they each project parallel one to another in cantilevered relationship from the main body of the mount. These projecting, self-supporting border portions of the slide mount are likely to become snagged on neighboring objects. Also, the slot iself is unattractively large, extending completely across one end and partially along the two side edges; thus, the Mundt and Florjancic slot occupies all or part of three edges of the mount.

In my U.S. Pat. No. 4,102,029, which issued on July 25, 1978, there is disclosed an improved method and apparatus for loading transparencies into a preclosed slide mount. As set forth in that patent, a film transparency is cut from a film strip, and the cut transparency is pushed into the pre-closed slide mount by means of the film strip itself which is intentionally bent into a longitudinally bowed configuration in order to provide longitudinal strength, in the manner of a longitudinally bowed carpenter's measuring tape, while the entrance edge of the slide mount is spread by wedges during the insertion.

As explained in U.S. Pat. No. 4,102,029, there are a number of advantages of utilizing the bowed film strip as the pusher element. The film may be cut to form each individual transparency before, not after, the transparency is inserted into the slide mount. The moving parts are very light with low inertial forces, because the individual cut transparency has only a small amount of mass to be accelerated. By virtue of the fact that the end of the film strip is used as a pusher, the pusher cannot wear out, for a new cut end is exposed in each recurring cycle of operation. Thus, high rates of speed and efficient, fast slide-loading production can be obtained with low power consumption in a compact, reliable slide-loading machine.

SUMMARY

An object of the present invention is to provide a pre-closed slide mount suitable for automatic loading of transparencies using a bowed film strip as the pusher element and which obviates the need for spreading the edge portions of the pre-closed slide mount by a wedge member or the like.

A further object of this invention is to provide a pre-closed slide mount which offers little resistance to a transparency being inserted into the mount, yet which subsequently securely retains the transparency within the pocket in the mount.

Further objects of this invention are to provide a pre-closed slide mount which may be molded as a single integral member of plastic material, such slide mount having sufficient rigidity for holding a transparency flat yet having a configuration at the entranceway to keep the resistance to loading of a film transparency to a minimum.

Among the advantages of the pre-closed slide mount embodying the present invention are those resulting from the fact that the mount is effectively pre-closed along all three edges, and yet the film transparency can be readily inserted without encountering much resistance so that relatively low pushing forces are involved and nevertheless the fully inserted transparency is securely retained in the pocket within the mount. In other words, the border portions of the pre-closed mount which define the entranceway need not be cantilevered from the main body of the mount as occurs in the mount described in U.S. Pat. No. 3,470,642.

Advantageously, the method and apparatus as described for loading the film transparency into the improved slide mount serve to retract the bowed film strip slightly during the end of each loading cycle for withdrawing the end of the bowed film strip out of the entranceway of the pre-closed slide mount after the film transparency has been fully pushed into the pocket therein.

In accordance with the invention in one of its aspects, a pre-closed slide mount for holding a film transparency comprises a pair of sides or masks united face-to-face for defining an internal pocket to retain a film transparency which is inserted edgewise through an opening or entranceway in one edge of the mount. The pre-closed mount defines a window for viewing the transparency after it has been loaded into the pocket in the mount. An elevated border region formed in one mask of the pre-closed slide mount extends transversely across the entranceway and has a sloping outer surface to provide a funnel for directing a transparency into the entranceway. This elevated border region is of a length less than the width of the transparency and less than the corresponding width of the pocket. At each end of this elevated border region there is a valley for receiving an outer edge of a longitudinally bowed transparency pusher, and these two spaced valleys permit the pusher to remain bowed until the transparency is firmly seated within the pocket in the pre-closed mount.

According to the invention in other of its aspects, the ends of the elevated border region slope laterally away from the adjacent border of the other mask to define the respective valleys, and the adjacent border forms an elevated roof over the elevated border region, that roof having inverted steps at the ends thereof over the laterally sloping end portions of the elevated border region. The film transparency and the bowed end of the pusher film strip are readily inserted into this advantageously configured entranceway. A deflecting surface inward of the elevated roof and over the pocket deflects a transparency into the pocket and an abrupt inner face of the elevated border region defines a shoulder at the entrance edge of the pocket to retain the transparency within the pocket.

According to other aspects of the invention, the elevated border region is elevated above the remaining border regions surrounding the transparency pocket and the relatively thin elevated roof has a sloping edge to provide a very flexible funnel element for accommodating the insertion of a transparency.

According to another aspect of the invention, a retraction clearance slot may be provided adjacent one of the valleys to provide clearance in order that a fully loaded mount may begin moving laterally away from the loading station even though the pusher strip has not yet been fully retracted out of the entranceway.

According to yet another aspect of the invention, the edges of the valleys away from the elevated border region form lateral guides for centering a transparency within the pocket, Thus, the transparency becomes relatively accurately registered laterally within the slide mount, and it is prevented from any significant tilting in its own plane in the mount.

According to other aspects of the invention, clamping ribs are positioned within the pocket adjacent the window for snugly holding the transparency within the pocket. Isolation grooves are provided along the edge of the pocket to prevent plastic flash from entering the pocket during an ultrasonic welding process.

According to a further aspect of the invention, the slide mount is formed of two mask sides joined by a plastic hinge having spaced alignment ridges thereon for accurately aligning the two sides of the mount prior to their being secured together.

The loading method as described may be embodied in such a way that the pawl which drives the bowed film strip for pushing a film transparency into a preclosed slide mount also serves to retract the bowed film strip a short distance during the end of each loading cycle for withdrawing the end of the bowed film strip out of the entranceway of the pre-closed slide mount after the film transparency has been fully pushed into the pocket in the mount. Thus, the loaded mount can be moved laterally away from the loading station.

The term "pre-sealed" or "pre-closed," as used herein, means that each slide mount has two sides or masks which are permanently fastened or secured together in closed position by the slide manufacturer defining a receiving pocket between them. This fastening can be achieved by adhesive bonding, thermal bonding, ultrasonic bonding or any other suitable technique for securing multiple plies or layers of cardboard or of plastic together.

BRIEF DESCRIPTION OF THE DRAWINGS

The foregoing and other aspects, objects, features, and advantages of the invention will become more fully understood from the following description of a preferred embodiment of the invention, as illustrated in the accompanying drawings, in which like reference characters refer to the same parts throughout the different views. The drawings are not necessarily to scale, emphasis instead being placed upon illustrating the principles of the invention.

FIG. 1 is an enlarged perspective view illustrating an improved slide mount embodying the invention with a transparency being pushed edgewise into the slide mount by a longitudinally bowed film strip serving as a pusher;

FIG. 1A is a partial elevation and sectional view as taken generally along the line A—A in FIG. 1, illustrating the advantageous loading method in which the pawl also serves to retract the bowed film strip a short distance;

FIG. 2 is an enlarged end view of the left side of the slide mount of FIG. 1 with the entranceway roof flexed upwardly slightly by the inserted transparency. The remaining Figures are all also drawn on enlarged scale;

FIG. 5 is a partial end view of the slide mount similar to FIG. 2 but before insertion of a transparency;

FIG. 6 is a longitudinal cross-sectional view of the pre-closed slide mount taken along line 6—6 of FIG. 4 and with a transparency mounted therein;

FIG. 7 is a partial longitudinal cross-sectional view of a closed slide mount taken along line 7—7 of FIG. 4;

FIG. 8 is a partial transverse cross-sectional view of the left side of the closed slide mount taken along line 8—8 of FIG. 4;

FIG. 9 is an enlarged plan view of a portion of the hinge taken from the lower center portion of FIG. 4;

FIG. 10 is a side view of the hinge of FIG. 9; and

FIG. 11 is a sectional view of the hinge of FIG. 9 taken along line 11—11.

DESCRIPTION OF A PREFERRED EMBODIMENT

Figure 3:
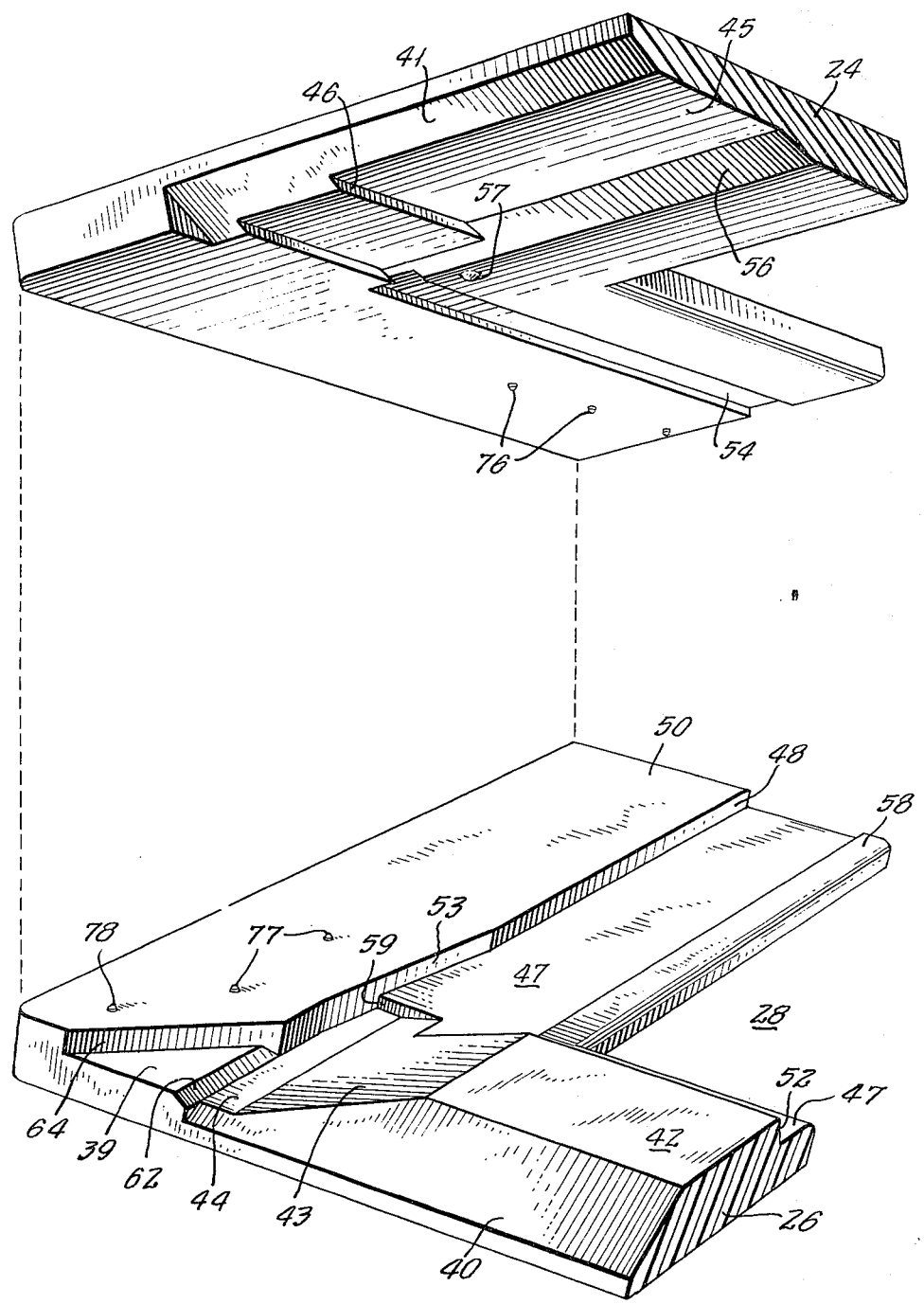
FIG. 3 is a partial perspective view of the lower and upper sides or masks of the slide mount of FIG. 1 with those mounts pulled apart.

As shown in FIG. 1, a pre-closed slide mount 22 in a loading station is formed from two sides or masks 24 and 26 joined face-to-face to define a window 28 and a funnel entrance 30 leading into an internal pocket as will be described in detail further below. A film transparency T is pushed into the funnel entrance 30 by means of a longitudinally bowed transparency strip S which serves as the pusher element.

The apparatus for advancing the pre-closed slide mounts one at a time into the loading station and for bowing the film strip S longitudinally and for cutting off the transparency T from the end of the film strip may be similar to that as described in my above-mentioned patent. However, no wedges are employed for opening the entrance into the pre-closed mount 22. It is to be noted that the mount 22 is effectively pre-closed along all three of its edges, i.e. along its hinge end 31 and along its two side edges 32 and 33. The entrance 30 does not extend all of the way across the front edge 34, and yet the film transparency can readily be slid into the pre-closed mount while encountering only relatively small resistance.

In FIG. 1, the relative thicknesses of the pre-closed slide mount 22 and the transparency T and film strip S are all exaggerated for purposes of clarity of illustration, and similar exaggerations of relative thicknesses are made in other views for clarity of illustration.

A film-engaging claw or pawl 35 enters into one of the sprocket holes 36 in the film strip S and remains engaged in this hole 36 during the full forward stroke F of this pawl which causes the bowed film strip S to push the previously cut-off transparency T into the pre-closed slide mount 22. As will be understood from a study of FIG. 6, the pocket which retains the transparency T is located within the slide at a distance from the entrance 30. Thus, the bowed leading (pushing) end L of the bowed film strip S proceeds into the entrance 30 for a sufficient distance to push the transparency T all of the way into the pocket within the pre-closed slide mount 22. Immediately after the transparency T is fully inserted, the bowed film strip S is retracted a short distance such that its leading end L is clear of the entrance 30.

As explained in U.S. Pat. No. 4,102,029, a preclosed slide mount may be moved laterally into the loading station, for example, in the direction 37 in FIG. 1. A loaded mount is then laterally moved out of the loading station in the direction 38, it being understood that the directions 37 and 38 could both be reversed. The leading end L of the bowed film strip is retracted clear of the entrance 30, so that the loaded mount can immediately be moved away laterally from loading station as indicated by the arrow 38.

In order to speed up the loading cycle even further, if desired, the loaded slide mount may begin moving laterally in the direction 38 even before the leading end L of the bowed film strip is fully withdrawn from the entrance 30. A diagonal clearance slot 39 at one side of the entrance 30 provides clearance for allowing the lateral movement 38 of the mount to occur while the bowed pusher film strip S is being retracted out from the entrance 30. The manner in which the pawl 35 advantageously serves to retract the bowed film strip S is short distance during its retraction stroke R (FIG. 1A) will be explained in detail further below.

The funnel entrance 30 is formed by an upwardly sloping surface 40 on the lower mask 26 and a downwardly sloping surface 41 on the upper mask 24, it being understood that such orienting terms as "upper" and "lower" are relative, being used for convenience of explanation. The pre-closed slide mount 22 may, in fact, be loaded upside down or standing on end or oriented diagonally with respect to the earth's horizon. In other words, the mount 22 can be loaded in other orientations, other than with the mask 24 positioned horizontally on top.

As shown in FIG. 2, the upwardly sloping surface 40 is formed on an elevated border region 42 of the lower mask 26. This elevated region 42 extends transversely and also has laterally sloping ends 43, one of which is shown in FIG. 2. Each sloping end 43 defines a valley, the floor of which is indicated at 44.

The border portion of the upper mask 24 over the elevated border region 42 forms an elevated roof 45 positioned over the elevated region 42, and that roof 45 has an inverted step 46 at each end thereof. The steps 46 are positioned over the laterally sloping surfaces 43.

Figure 4:
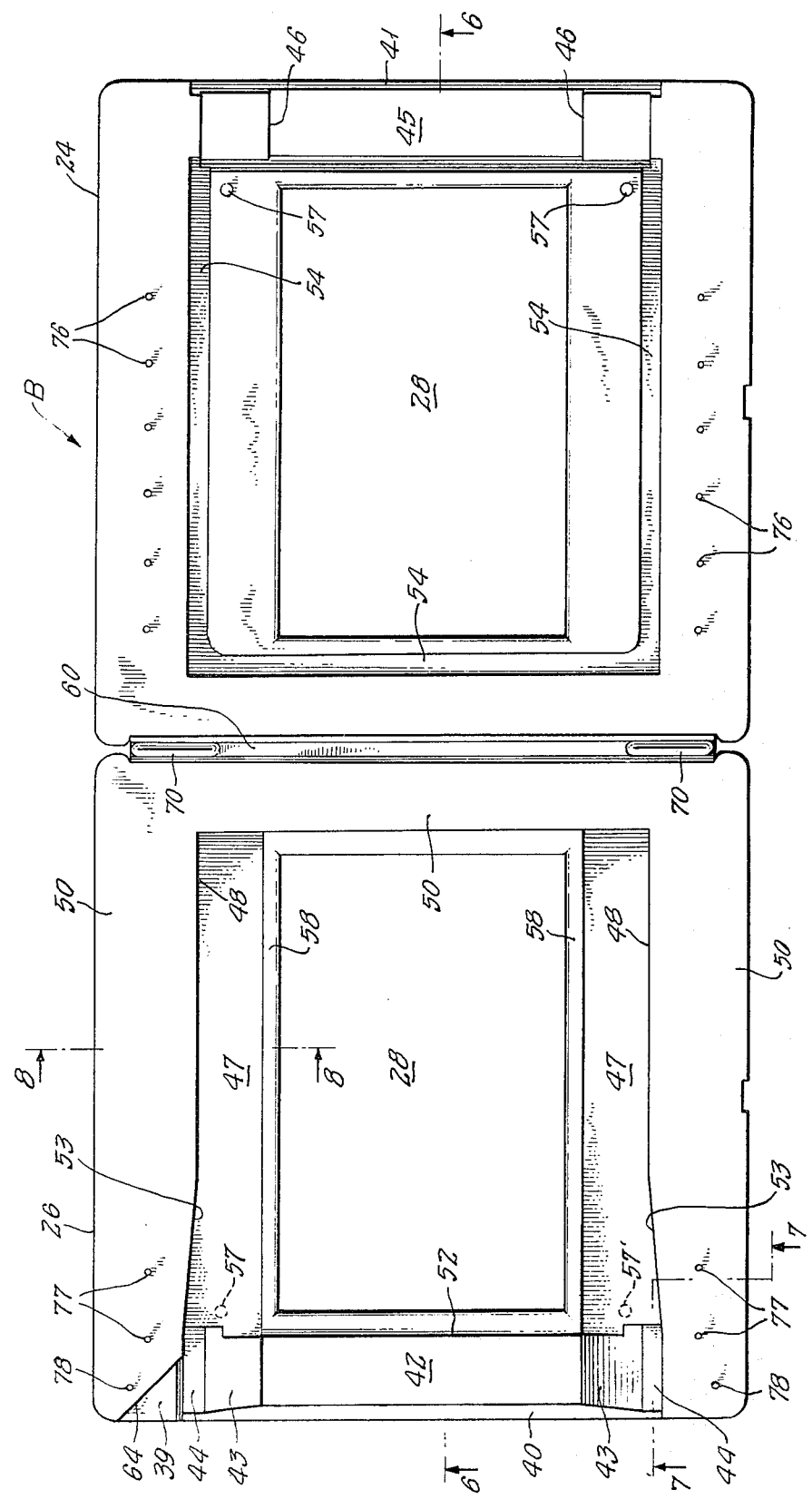
FIG. 4 is a plan view of the improved slide mount in its open position prior to securing of the two sides together to form the pre-closed mount.

As best shown in FIGS. 3 and 4, a pocket recess 47 surrounding the window 28 is defined and surrounded on three sides by the inner vertical face 48 of a border region 50. Along the entrance border portion of the lower mask 26, the pocket is defined by the inner vertical face 52 of the elevated border region 42. Thus, the elevated border region 42 not only serves to provide a sloping funnel entrance surface 40 for the transparency and valleys 44 for the bowed pusher, but also provides an inwardly-facing transparency-retaining shoulder 52. With the exception of the elevated roof 45, downwardly sloping funnel surface 41 and deflecting surface 56, and inverted steps 46 along the entrance border portion of the upper mask 24 and an isolation groove 54 to be discussed subsequently, the inside (lower) face of the mask 24 is substantially flat. Thus, the transparency, once loaded in the slide mount, is seated within a pocket 47 in the lower mask 26 below the upper mask 24 which defines the top surface of the pocket.

As shown in FIG. 6, the deflecting surface 56 for deflecting a transparency downwardly into the pocket 47 is provided in the upper mask 24 behind the elevated roof 45 and inward of the transparency-retaining shoulder 52 of the elevated border region 42.

As shown in FIGS. 3 and 4, the inner face 48 of each of the side borders 50 is flared outwardly slightly adjacent to the rear end of the valley floor 40 to form converging lateral guides 53. With these lateral guides 53 converging inwardly, any off-centered transparency is laterally aligned by these guides as the transparency T is pushed into the pocket 47. Once seated in the pocket 47, the film is clamped snugly by a clamping rib 58 positioned within the pocket 47 to each side of the window 28. By means of these clamping ribs, sufficient frictional engagement is made with the transparency to prevent the transparency from shifting within the pocket 47; but resistance to the transparency moving into the pocket is substantially less than it would be if the entire pocket had the reduced clearance provided at the clamping ribs 58. Advantageously, these clamping ribs 58 are located immediately adjacent to the perimeter of the window 28 for holding the transparency T smooth and flat in this window.

As shown in FIG. 8, by virtue of the converging lateral guides 53, there can be very little clearance between the longitudinal edges of the transparency T and the inner faces 48 of the side borders 50. Thus, the transparency is relatively accurately registered laterally within the slide mount, which produces accurate vertical registration in the projector. The longitudinal edges of the transparency are its manufactured edges as distinguished from the end 61 (FIG. 1) which is cut just prior to loading, and therefore these longitudinal edges are truly parallel and very accurately spaced apart.

In addition, the closely adjacent relationship between the faces 48 or side walls of the pocket and the longitudinal edges of the transparency prevent the transparency from "cocking," i.e., from tilting in its own plane in the mount. Therefore, a projected picture is horizontal and does not have an annoying tilt. In summary, the present slide mount and loading method and apparatus do not rely upon sprocket holes to provide registration in the mount. Advantageously, much of the loose lateral fitting and picture cocking tendencies of transparencies in prior art slide mounts are avoided.

Additionally, frictional gripping humps 57 (FIGS. 3 and 4) are provided on the upper mask 24 in the pocket 47. These humps 57 are aligned with localized regions 57' (FIG. 4) which are located closely behind the deflecting surface 56. The humps 57 press the corners of the seated transparency against the pocket floor immediately behind the retaining shoulder 52 and prevent the transparency from sliding back up over the shoulder 52 of the elevated border region 42.

Funneling of the transparency into the entrance 30 can best be understood with reference to FIG. 2. As shown in FIG. 2, the opposed border portions of the mask 24 and 26 forming the funnel entrance 30 are resiliently spreadable as the transparency T is easily slid beneath the step 46, for the elevated roof 45 is readily slightly bowed upwardly away from the elevated border region 42. As shown in FIG. 5, each of the inverted steps 46 is normally spaced slightly up away from the respective laterally sloping surface 43 of the elevated border region 42, leaving a gap 60. Consequently, the entrance 30 is already partially open. The entrance 30 of the pre-closed mount spreads fully open with only slight flexing of the elevated roof 45, and an entranceway for receiving the transparency into the pocket 47 (FIG. 3) is provided. With the roof slightly flexed as shown exagerated in FIG. 2, the transparency rides over the elevated border region 42 and is then deflected downwardly by the surface 56 into the pocket 47.

The bowed film strip pusher S follows the transparency T into the entranceway, and the corners of the leading end L of the bowed pusher are received unimpeded in the valleys 44. As seen in FIGS. 2 and 3, the valley floors 44 are lower than the pocket 47, and the ends 59 of the valleys (FIG. 3) are somewhat behind the retaining shoulder 52 of the elevated border region 42. Thus, the pusher film can make a full stroke to seat the transparency T in the pocket 47 without jamming against the valley-end surfaces 59.

By virtue of the configuration of the entrance 30, as seen in FIGS. 2 and 5, the leading end L (FIG. 1) of the film strip advantageously can remain in its bowed shape, even after it has entered into the entrance, thereby assuring a positive pushing relationship of the bowed end L against the back edge 61 (FIG. 1) of the generally flat transparency T. As seen in FIG. 1, the bowed end L intersects with the generally straight back edge 61 at two symmetrically located regions X for providing a stable forward push against the transparency.

Once the transparency has cleared the elevated border region 42, and the pusher strip S have been retracted, the roof 45 returns to its relaxed position and the transparency T is clamped within the pocket 47 by the overhead humps 57 which hold the back edge 61 of the transparency down behind the retaining shoulder 52.

As can be seen in FIGS. 2, 3, 5 and 6, the elevated border region 42 is elevated above the level of the border region 50 which extends along near three edges of the mount. This border region 50 is U-shaped, as seen in plan view in FIG. 4, and forms the interface between the upper and lower masks 24 and 26. The elevated roof portion 45, including the inverted step 46, is spaced above the elevated border region 42 even when the masks are not spread apart by a transparency. This structural configuration has several advantages. It results in a relatively thick transverse border member in the lower mask 26 at the entranceway to provide the rigidity desirable to hold a slide flat. In effect, the elevated border portion 42 forms a relatively rigid strut or leg extending across between and joining together the ends of the two legs of the U-shaped border region 50 which encircles the other three sides of the window 28. The corresponding border portion 45 or leg of the upper mask 24 is relatively thin and can thus readily flex when a transparency T is inserted into the slide mount, thereby reducing resistance to movement of the transparency and reducing the possibility of damaging the transparency or bowed pusher strip. The elevated border region 42 also increases the height of the transparency-retaining shoulder 52 so that the fully inserted transparency will not slip back out of the slide mount once seated in the pocket 47.

As noted above, the elevated roof 45 flexes upwardly when the transparency readily slides into the gap 60 between the inverted step 46 and the sloping end surface 43 of the elevated border region 42. The central portion of the elevated roof thus bows upwardly, as shown in FIG. 2, and is spaced above the central area of the slightly convex upwardly bowed transparency. Thus, the viewing portion of the transparency will not rub forcefully against the roof, thus scuffing of the picture area is avoided.

Sliding of the transparency between the corner of the inverted step 46 and the lateral slope 39 of the elevated border region 42 also causes the transparency T to bow somewhat convex upwardly. Thus, the under surface of the viewing portion of the transparency is also spaced from the flat top of the elevated border region 42 to prevent scratching of the underside of the transparency.

As mentioned above, once the transparency has been pushed beyond the retainer shoulder 52, the bowed pusher strip is retracted. In order to increase the speed of the loading operation, if desired, the loaded slide mount may be moved laterally, as mentioned above, in the direction 38 away from the loading position even before the pusher element has been completely retracted. To avoid binding of the pusher element with this lateral movement 38 of the loaded slide mount, the retraction clearance slot 39 is provided. Thus, with the slide mount moving to the right, as viewed in FIG. 5, the corner of the leading end L of the bowed pusher strip 5 rises up along the chamfered edge 62 of the slot floor and the pusher is fully retracted before abutting the angled clearance slot wall 64.

As shown in FIG. 4, the two masks 24 and 26 form two dissimilar sides of a single integrally molded plastic blank B formed of stiffly flexible and tough, durable plastic material, for example, such as high impact strength polystyrene. These masks are hinged together by a thin region of interconnecting plastic material 66 which forms the floor of a channel having sloping sides 68 (FIG. 11). A hinge alignment ridge 70 is formed at each end of the channel 66, 68; in other words, at each end of the hinge region. Each hinge alignment ridge 70 is formed with surfaces angled at 45° as are the sides 68 of the channel. Rectangular crosssection grooves 72 are formed along both sides of the base of the ridge 70 to reduce the amount of plastic at the flexure regions. The side 24 is folded over flush against the side 26, as best shown in FIG. 6, with the channel walls 68 abutting against the sloping surfaces of the respective ridge 70. This abutment of the two widely spaced alignment ridges 70 against the sloping channel walls at each end of the hinge region 66 forces the folded masks 24 and 26 into proper alignment with each other. It is significant that there are only two spaced ridges 70 provided rather than a continuous ridge extending across the entire hinge as taught in my patent. With a continuous ridge, it is not unlikely that some deformation of or dust on the ridge toward the mid-portion thereof will form a fulcrum causing wobbling at the hinge and thus misalignment of the masks 24 and 26. This wobble problem is avoided with the use of two widely spaced ridges, which provide positive hinge alignment.

As shown in FIGS. 3 and 4, ultrasonic energy directors in the form of small bumps 76 and 77 are provided in the respective masks. All of these energy directing bumps 76 and 77 are shown aligned along two straight lines parallel with the respective side edges 32 and 33 of the slide mount when the masks are folded over in flush together relationship. There is an additional bump 78 which is offset toward each front corner of the mount near the respective ends of the entrance 30 for firmly securing the two front corners of the masks together at opposite ends of the entrance. There may be a plurality of the bumps 78 closely spaced in a group near each of the front corners of the mount. In effect, the mount is advantageously pre-sealed along three edges plus being presealed along the outer portions of the fourth edge. Thus, advantageously, the lateral width W (FIGS. 1 and 5) of the entrance 30 is only slightly greater than the width of the transparency T. The width W is also only slightly greater than the width of the pocket 47 as accounted for by the slight outward flaring of the lateral guide faces 53 (FIG. 3). The relatively compact width W of this entrance into the preclosed mount 22 reduces the likelihood of foreign objects becoming snagged in the opening or damaging the film transparency contained in the mount.

During ultrasonic welding of the two masks in their folded position, these energy directors 76, 77, 78 concentrate ultrasonic energy at localized spots to assure secure bonding of the mask by a sequence of spot welds. Also, to provide a clean bond, an isolation groove 54 is provided in the upper mask 24. This isolation groove is positioned to be elevated above the inner margin of the border region 50. Moreover, this isolation groove 54 spans over the inner face 48 of the border region 50 as best shown in FIG. 8. Any plastic flash which might occur during the ultrasonic welding operation remains in the portion of the groove 54 away from the pocket 47. The perimeter of the pocket 47 is thus kept clean for easy insertion of a transparency.

It is to be understood that the particular location of the ultrasonic energy directors 76 and 77 is a matter of reasonable choice, and their locations as shown in FIGS. 3 and 4 is illustrative. It is desirable that the energy directions 78, or groups of such directors, be located generally in the relative position as shown.

As discussed earlier, the sprocket-hole engaging pawl 35 serves to retract the bowed film strip S a short distance during its retraction stroke R, so that the leading end L of the strip will be cleared by the loaded slide mount when the loaded mount is moved laterally, as indicated by the arrow 38. In order to accomplish this retraction of the film strip S, the pawl 35 has a rear surface 80 which extends perpendicular to the length of the film strip S. At the commencement of the retraction stroke R, this rear surface 80 of the pawl abuts against, i.e. hooks onto, the rear edge of the already-engaged sprocket hole 36. Thus, the retracting motion R of the pawl pulls the film strip back out of the entrance 30.

The pawl 35 is pivotally mounted by a pivot pin 82 (FIG. 1A) onto a carriage 84 which can be reciprocated back and forth along a guide rail 86. There is a reciprocating drive mechanism 88 which is connected as indicated by the dashed line 90 to drive the carriage 84 back and forth along the guide rail 86 for producing a forward and a backward stroke F and R of the carriage 84 of the same length during each loading cycle. This reciprocating pawl carriage 84 with its reciprocating drive mechanism 88 and interconnection 90 may be similar to the apparatus as shown in my recently issued patent mentioned above. The pawl 35 is L-shaped and has a downwardly extending leg 91 onto which is hooked a tension spring 92 anchored onto a pin 94 on the carriage. Thus, the forwardly extending leg 96 of the pawl is continuously urged upwardly toward the margin of the film strip S in which the sprocket holes are located.

In order to limit the retraction of the film strip S, to a predetermined minor portion of the pawl retraction stroke R so that its leading end L will stop approximately 1/32nd to 1/16th of an inch away from the end 34 of the slide mount 22, there are pawl-control means 98 to be described. The pawl-control means 98 include a cam-follower pin 100 mounted on the forward leg 96 near its pawl end 35, and a pawl jog bar 102 mounted parallel with the sprocket-hole margin of the film strip. This jog bar has two straight surfaces 104 and 106 with a sloping cam surface 108 between them. The forward straight surface 104 of the pawl jog bar 102 is at a higher elevation than the rear straight surface 106, and both of these straight surfaces 102 and 106 extend parallel with the margin of the film strip in which the sprocket holes are located. The spring 92 urges the cam-follower pin 100 upwardly in sliding contact with the jog bar 102.

The forward straight surface 104 is sufficiently elevated that when the cam-follower pin 100 is sliding rearwardly along this surface 104, the rear surface 80 of the pawl 35 can engage, or hook onto, the rear edge of the same sprocket hole 36 in which it was engaged during the preceding forward stroke F. However, when the retracting motion R (FIG. 1A) of the carriage 84 has reached a predetermined desired amount, the cam-follower pin 100 slides down along the sloping surface 108 causing the rear surface 80 of the pawl to become depressed below the sprocket hole. Thus, the pawl becomes unhooked from the sprocket hole and allows the film strip S to stop. As the carriage 84 continues its reaction stroke R, the cam-follower pin now slides rearwardly along the lower straight surface 106 as shown at 100′, causing the pawl to slide rearwardly beneath the sprocket holes as indicated at 35′ without engaging in them. The top of the pawl tip is inclined downwardly toward the rear as shown at 110 for enabling the depressed pawl to slide rearwardly as seen at 35′ without hooking into the sprocket holes.

After the carriage 84 has fully retracted, the next transparency is cut off from the end of the film strip by cutting means, for example, as described in my recently issued patent. The next slide mount is moved as indicated at 37 into the loading position, for example, by slide mount feed means as described therein, and the carriage 84 begins its forward stroke F. As soon as the forward stroke commences, the inclined top surface 110 on the pawl immediately allows the pawl tip to engage into the adjacent sprocket hole to begin pushing the bowed strip S forward. The cam-follower pin 100 sequentially slides along the surfaces 106-108-104 during the forward stroke of the pawl. During this forward stroke the inclined surface 108 allows the spring-biased pawl to elevate further into the already-engaged sprocket hole. Because the front surface 112 of the pawl extends perpendicular to the margin of the film strip, this further elevation of the pawl during its forward feed stroke does not adversely affect the smooth forward thrust being exerted onto the film strip by the forwardly travelling pawl.

Thus, advantageously the pawl feed mechanism is also used to provide the retraction of film strip out of the entrance 30 of the loaded slide mount. As an example of this pawl feed and retraction operation, the carriage 84 may reciprocate forward and reverse by an overall stroke distance of approximately 1 13/16ths of an inch each way, when feeding film transparencies T having a length of approximately 1.5 inches. The leading end L of the bowed film strip S is advanced into the entrance 30 by a distance of approximately 1/4th of an inch for fully inserting the transparency T into the pocket 47. Then, the film strip is retracted by the pawl surface 80 for a distance of approximately 5/16ths of an inch, causing the leading end L of the bowed film strip to stop approximately 1/32nds to 1/16ths of an inch away from the end 34 of the loaded slide mount. The pawl continues retracting for a distance of approximately 1½ inches to complete its retraction stroke.

It will be understood that other stroke lengths can be used depending upon the length of the film transparency and the size of the slide mount and the location of the transparency-receiving pocket within the mount.

While the invention has been particularly shown and described with reference to a preferred embodiment thereof, it will be understood by those skilled in the art that various changes in form and details may be made therein without departing from the spirit and scope of the invention as defined by the appended claims.

I claim:

1. A pre-closed slide mount of rectangular configuration for receiving and holding a rectangular film transparency comprising:

a first and second rectangular mask secured together in face-to-face relationship for defining an internal pocket in which a rectangular film transparency is held, said pocket having a width as measured in the plane in which the transparency is held which is very slightly wider than the width of the transparency as measured in said plane;

said masks having registering windows for viewing the transparency held in said pocket;

the portions of said first and second masks extending along one edge of the mount defining an entrance between them leading into said pocket;

said portion of said first mask including an elevated border region adjacent to said entrance, said elevated border extending along said portion of said first mask near said one edge for a distance less than said width of the pocket;

said elevated border region having a sloping outer surface adjacent to said one edge to provide a funnel for directing a transparency between said portions of said first and second masks;

said portion of said first mask defining a pair of valleys adjacent to the opposite ends of said elevated border region, said valleys being adapted for receiving into said entrance the outer edges of a longitudinally bowed pusher which bows up over said elevated border region when the bowed pusher is pushing the film transparency through said entrance into said pocket;

each of said valleys being defined in part by the respective end of said elevated border region sloping laterally downwardly and outwardly;

said portion of said second mask defining an elevated roof of said entrance spaced above said elevated border region, and said elevated roof having a pair of inverted steps at the respective ends thereof positioned over the laterally sloping ends of said elevated border region.

2. A pre-closed slide mount as claimed in claim 1, in which said elevated roof is resiliently flexible for flexing slightly and becomes bowed upwardly by a film transparency sliding between said laterally sloping ends of said elevated border region and said inverted steps.

3. A pre-closed slide mount as claimed in claim 1, wherein said inverted steps are spaced away from said laterally sloping ends of said elevated border region when said elevated roof portion of said second mask is in its normal relaxed position, the spacing between said laterally sloping ends and said inverted steps being less than the thickness of the film transparency.

4. A pre-closed slide mount as claimed in claim 1, 2 or 3, in which:

said pre-closed mount has a diagonal clearance slot at the end of the entrance; and said diagonal clearance slot extends in a direction parallel with said one edge of the mount for providing clearance for permitting the mount to be moved in a direction parallel with said one edge at the same time as a film transparency pusher is being withdrawn from said entrance.

5. A rectangular pre-closed slide mount for receiving and holding a rectangular film transparency comprising:

a first and a second mask secured together in face-to-face relationship for defining an internal pocket in which a rectangular film transparency is held;

said masks having registering rectangular windows for viewing the transparency held in said pocket;

said mount having a front edge;

the portions of said first and second masks extending along the front edge of the mount defining an elongated entrance between them leading into said pocket for admitting a transparency inserted edgewise into said pocket;

said portion of said first mask including an elevated border region, which is elevated near the center of said front edge relative to the two ends of said elongated entrance;

said portion of said second mask having respective end regions adjacent the respective ends of said elongated entrance which are lower than the center of said portion of said second mask;

whereby said elongated entrance as seen in elevation is higher in the center than at each end for receiving into said entrance a longitudinally bowed pusher which is bowed convex upwardly and serves to push the transparency into the pocket in the mount;

said elevated border region having an abrupt inner shoulder facing inwardly toward said pocket for retaining a transparency in said pocket;

said second mask having holding means protruding downwardly into said pocket behind said shoulder for holding the edge of the transparency down relative to said shoulder; and said holding means including a pair of spaced protrusions which are laterally spaced from each other more widely than the width of said window for depressing the two marginal regions of the edge of the transparency down relative to said shoulder for firmly capturing the transparency in said pocket behind said shoulder.

6. A pre-closed slide mount of rectangular configuration having four edges, said mount being adapted for receiving and holding a rectangular film transparency, said mount being claimed in this claim as it appears when resting upon a horizontal surface with its four edges extending horizontally (with the understanding that the mount can be handled and used in other orientations), said pre-closed slide mount comprising:

an upper rectangular mask;

a lower rectangular mask;

said masks being secured together in face-to-face relationship having an internal pocket between them for receiving and holding a rectangular film transparency in a horizontal plane with the four edges of the transparency each spaced inwardly from the respective four edges of the mount;

said masks having registering windows for viewing a transparency held in said pocket;

the portions of said upper and lower masks extending along one edge of the mount (herein called the "front edge") defining an entrance between them leading into said pocket;

said entrance extending horizontally along said front edge for the major part of the length of said front edge;

said portion of said lower mask including an elevated border region adjacent to said entrance, said elevated border region extending in a direction parallel with said front edge for a distance less than the horizontal extent of said entrance, said elevated border region being located equidistant from the ends of said entrance, said elevated border region rising up to a height near the center of said front edge above the level of the horizontal plane in which the film transparency is held when in said pocket;

said elevated border region having an upwardly and inwardly sloping surface adjacent to said front edge for providing a funnel for directing a transparency into said entrance between said portions of said upper and lower masks;

said portion of said lower mask defining a pair of valleys near the respective opposite ends of said entrance, each of said valleys having a floor below the level of the horizontal plane in which the film transparency is held when in said pocket, said valleys being adapted for receiving into said entrance the outer edges of a longitudinally convex-upwardly-bowed pusher which bows up over said elevated border region when the bowed pusher is pushing the film transparency through said entrance into said pocket; and said portion of said upper mask defining an elevated roof of said entrance which is spaced above said elevated border region near the center of said front edge for receiving into said entrance the upwardly bowed center portion of said transparency pusher.

7. A pre-closed slide mount as claimed in claim 6, in which the respective opposite ends of said elevated border region slope downwardly toward the respective valley floors.

8. A pre-closed slide mount as claimed in claim 7, in which said portion of said upper mask has respective regions spaced above the respective downwardly sloping ends of said elevated border region, said respective regions being at a level below the level of said elevated roof.

9. A pre-closed slide mount as claimed in claim 6 or 7, in which said portion of said upper mask has respective regions spaced above the respective valley floors which are below the level of said elevated roof.

10. A pre-closed slide mount as claimed in claim 6, 7 or 8, in which said masks are secured together along the full horizontal extent of the three edges other than said front edge.

11. A pre-closed slide mount as claimed in claim 6, 7 or 8, wherein the upper one of said masks have a deflecting surface positioned inward of said elevated border region and located over the juncture of said entrance with said pocket to deflect a transparency downwardly into said pocket.

12. A pre-closed slide mount as claimed in claim 6, 7 or 8, in which said elevated border region has an abrupt inner face facing inwardly toward said pocket, said abrupt inner face extending generally pependicular to said horizontal plane, said abrupt inner face defining a transparency-retaining shoulder located at the juncture of said entrance with said pocket, said abrupt inner face extending horizontally less than the horizontal extent of said entrance and being centrally located with respect to the horizontal extent of said entrance and rising above said horizontal plane.

13. A pre-closed slide mount as claimed in claim 12, in which the upper mask has a deflecting surface sloping downwardly and inwardly and being positioned generally above and inwardly of said transparency-retaining shoulder for deflecting an inserted film transparency downwardly into said pocket behind said shoulder.

14. A rectangular pre-closed slide mount for receiving and holding a rectangular film transparency comprising:

a first and second mask secured together in face-to-face relationship for defining an internal pocket in which the transparency is held;

said masks having registering windows for viewing a rectangular film transparency when held in said pocket;

the portions of said first and second masks extending along the front edge of the mount defining an elongated entrance between them leading into said pocket for admitting a transparency inserted edgewise into said pocket;

said elongated entrance extending along said front edge of the mount for a distance less than the full length of said front edge, said elongated entrance having one end thereof near one end of said front edge and having the other end thereof near the other end of said front edge;

said portion of said first mask including an elevated border region, which is elevated near the center of said front edge;

said elevated border region being spaced equal distances away from the two ends of said elongated entrance;

said portion of said first mask including two valleys, said valleys being located near the respective ends of said elongated entrance, the floor of said valleys being below said elevated border region;

said portion of said second mask having a first region near the center of said front edge which is spaced above said elevated border region;

said portion of said second mask having respective end regions adjacent the respective ends of said elongated entrance which are lower than said first region of said portion of said second mask;

whereby said elongated entrance as seen in front elevation is higher in the center than at each end for receiving into said entrance a longitudinally bowed pusher which is bowed convex upwardly in the center for pushing a transparency into the pocket in the mount.

15. A pre-closed slide mount as claimed in claim 14, in which said elongated entrance extends along the edge of said mount which is called the front edge, and the extent of said elongated entrance along said front edge is significantly less than the overall length of said front edge; and said first and second masks are secured together along the three other edges and also are secured together in the two regions of the front edge near the opposite ends of said elongated entrance.

16. A pre-closed slide mount as claimed in claim 14 or 15, in which said portion of said second mask extending along said front edge defines an elevated roof spaced above said elevated border region of the other mask.

17. A pre-closed slide mount as claimed in claim 14, 15 or 16, in which said elevated border region has an abrupt inner shoulder facing inwardly toward said pocket for retaining a transparency in said pocket; and said second mask having holding means protruding downwardly into said pocket behind said shoulder for holding the edge of the transparency down relative to said shoulder.

18. A pre-closed slide mount as claimed in claim 6, 15, 16 or 17 in which said internal pocket has two side walls extending parallel to each other along the major portion of their length; said side walls being accurately spaced apart very nearly the same distance as the distance between the manufactured longitudinal edges of the transparency to be inserted into the pocket; said side walls diverging gradually outwardly toward the respective ends of said entrance for forming converging lateral guides with respect to the inserted transparency, whereby the inserted transparency becomes accurately registered laterally by said accurately spaced parallel side walls and also is prevented from tilting in its own plane in said pocket.

* * * * *